(12) United States Patent
Broussard (10) Patent No.: US 6,889,100 B1
(45) Date of Patent: May 3, 2005

(54) METHOD AND SYSTEM FOR REMOTE JAVA AUDIO SERVER IN A HETEROGENEOUS DISTRIBUTED ENVIRONMENT

(75) Inventor: Scott J. Broussard, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,841

(22) Filed: Sep. 9, 1999

(51) Int. Cl.$^7$ .............................................. G06F 17/00
(52) U.S. Cl. ...................... 700/94; 709/219; 709/230; 709/231
(58) Field of Search .............................. 709/219, 230, 709/231; 700/94; 395/600

(56) References Cited

U.S. PATENT DOCUMENTS

| | | | |
|---|---|---|---|
| 5,392,400 A | 2/1995 | Berkowitz et al. | 395/200 |
| 5,544,320 A | 8/1996 | Konrad | 395/200.09 |
| 5,623,690 A | 4/1997 | Palmer et al. | 395/806 |
| 5,696,901 A | * 12/1997 | Konrad | 709/203 |
| 5,748,499 A | 5/1998 | Trueblood | 364/551.01 |
| 5,794,018 A | 8/1998 | Vrvilo et al. | 395/551 |
| 5,844,553 A | 12/1998 | Hao et al. | 345/329 |
| 5,845,074 A | 12/1998 | Kobata | 395/200.49 |
| 5,867,653 A | 2/1999 | Aras et al. | 395/200.34 |
| 5,893,053 A | 4/1999 | Trueblood | 702/187 |
| 5,974,444 A | * 10/1999 | Konrad | 709/203 |
| 6,216,152 B1 | * 4/2001 | Wong et al. | 707/10 |
| 6,407,751 B1 | * 6/2002 | Minami et al. | 715/736 |

FOREIGN PATENT DOCUMENTS

| | | | |
|---|---|---|---|
| EP | 852361 A2 | 7/1998 | G06F/17/30 |
| EP | 852443 A2 | 7/1998 | H04N/7/173 |

OTHER PUBLICATIONS

Levergood, Thomas, et al., "AudioFile: A Network—Transparent System for Distributed Audio Applications", Cambridge Research Laboratory, Jun. 11, 1993.*
International Business Machines; Technical Disclosure Bulletin; vol. 40, No. 10, Oct. 1997; Structured Metadata for Application Specific Viewers for Streamed Internet Video/Audio; pp. 123–127.
Ginsberg, et al.; The Little Web Schoolhouse: Using Virtual Rooms to Create A Multimedia Distance Learning Environment; 1998; pp 89–98.
International Business Machines; Research Disclosure; Jun. 1998; Java Applet Attached to E–Mail, p. 806.
International Business Machines; Research Disclosure; Jul. 1998; Method For Selecting Audio–Clips To Play During Visual Presentation Of Web Pages; p. 983.

* cited by examiner

Primary Examiner—Hosain Alam
Assistant Examiner—Shabana Qureshi
(74) Attorney, Agent, or Firm—Duke W. Yee; David A. Mims, Jr.; Stephen J. Walder, Jr.

(57) ABSTRACT

A method and system for an audio server in a heterogeneous distributed environment is provided. A Java application executes on a host machine under X Windows or RAWT (Remote Abstract Window Toolkit), and the Java application generates audio data and graphic data. The graphic data is sent to a display server on a client machine specified by a display environment variable. Although neither X Windows nor RAWT have audio support, a Java audio driver on the host machine determines whether an audio environment variable or an audio command line parameter is specified on the host machine. In parallel to the graphic data, the audio data is then sent to a Java audio server on the client machine specified by the audio environment variable or the audio command line parameter, and played using the local audio support, in Java, on the client machine on which the user can hear the audio.

12 Claims, 7 Drawing Sheets

Figure 1

Figure 2A
200 server

Figure 6

METHOD AND SYSTEM FOR REMOTE JAVA AUDIO SERVER IN A HETEROGENEOUS DISTRIBUTED ENVIRONMENT

BACKGROUND OF THE INVENTION

1. Technical Field

The present invention relates to an improved data processing system and, in particular, to a method and system for multicomputer data transferring, specifically, distributed data processing in a client-server environment.

2. Description of Related Art

Given the increasing capabilities and decreasing costs of information processing and data networking technologies, the network is rapidly expanding its reach. The emerging infrastructure of computers interconnected by networks presents users with the ability to execute applications in a variety of configurations.

The X Window system is a network-based graphical windowing system for workstations. X Windows has been widely adopted as an industry standard supported by a consortium of industry leaders. Many Unix machines include X Windows as part of their operating system.

The X Window system is based upon the client-server model. A client application is an application program which performs a specific task. A display server application is a program which acts as the intermediary between client applications and the machine hardware. The display server application keeps track of all user and client application input/output. Ordinarily, the display server program is started automatically, or once started, executes for an entire user session.

One challenge presented to application developers by a network computing environment is the wide range of devices that are interconnected by networks. A typical network usually has many different kinds of attached devices with diverse hardware architectures, operating systems, and application support. Java runtime environments address this challenge by enabling the creation of platform-independent applications. A single Java application can execute unchanged on a wide variety of hardware platforms. Compared with applications written for a specific hardware and operating system platform, platform-independent programs written in Java can be easier and cheaper to develop and maintain. A Java application may run on a Java runtime platform that has been tailored for execution on a specific platform consisting of specific hardware and its platform-specific supporting operating system. By developing a Java runtime environment for various operating systems, the Java runtime environment acts as an intermediate layer between a Java application and a platform-specific operating system and provides platform-independence for the Java application.

Java runtime environments have been developed for several different computing platforms, such as Unix workstations. When a Java application is executing on a Unix host machine through X Windows, the graphics generated by the Java application may be distributed using the X Windows protocol to an X Windows server that is running on a client machine.

The Java runtime environment contains an audio playback engine that uses the native audio support of the supporting machine to play the audio data. However, there is no support for audio in the X Windows protocol. In most cases, when a Java application on a host machine generates an audio datastream, the underlying platform-specific operating system will employ the audio support of the underlying machine so that the audio will be audible at the underlying host machine and not the client machine. Hence, if a user at a client machine remotely executes a Java application on a host machine, the graphics for the Java application will appear on the user's client machine, but the audio will be played on the remote host machine, and the user will not hear the generated audio on the client machine. This situation is possibly unexpected to the user and certainly undesirable.

Therefore, it would be advantageous to provide a method and system for remote audio processing in a distributed heterogeneous environment, and in particular, to provide distributed audio that has the advantages provided by Java platform-independence.

SUMMARY OF THE INVENTION

A method and system for an audio server in a heterogeneous distributed environment is provided. A Java application executes on a host machine under X Windows or RAWT (Remote Abstract Window Toolkit), and the Java application generates audio data and graphic data. The graphic data is sent to a display server on a client machine specified by a display environment variable. Although neither X Windows nor RAWT have audio support, a Java audio driver on the host machine determines whether an audio environment variable or an audio command line parameter is specified on the host machine. In parallel to the graphic data, the audio data is then sent to a Java audio server on the client machine specified by the audio environment variable or the audio command line parameter, and played using the local audio support, in Java, on the client machine on which the user can hear the audio.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
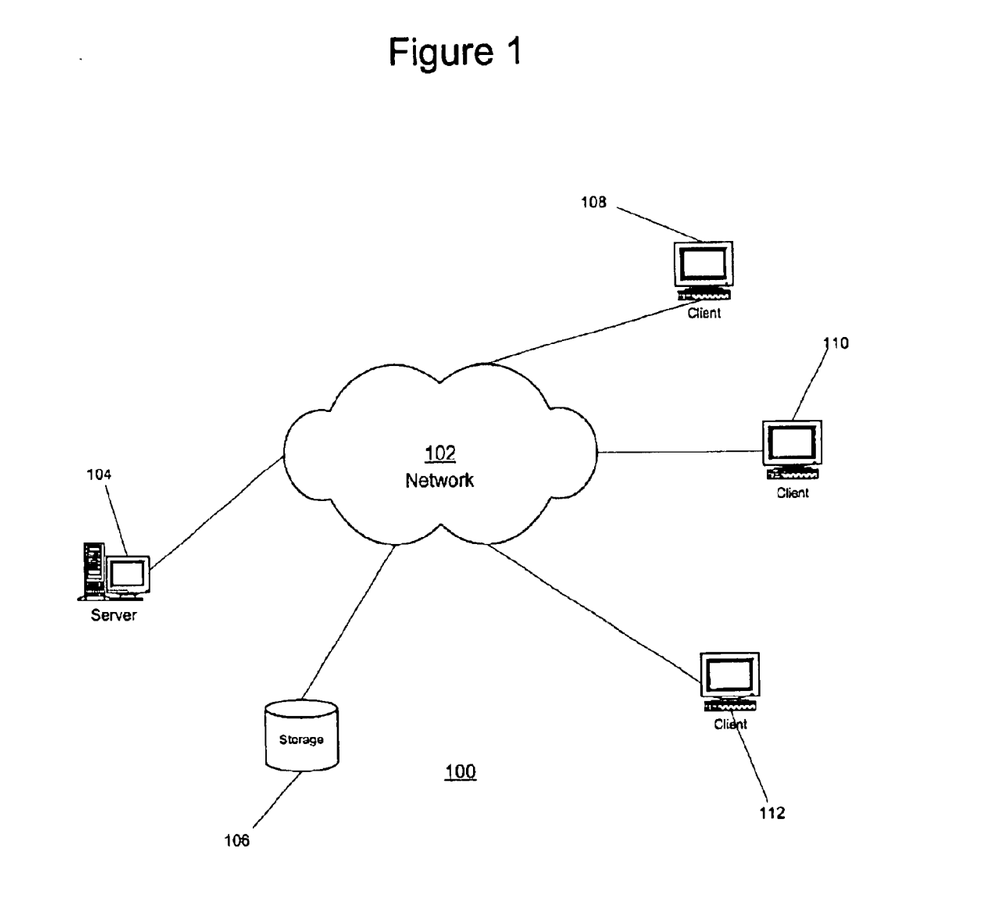
FIG. 1 depicts a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 109, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

Figure 2A:
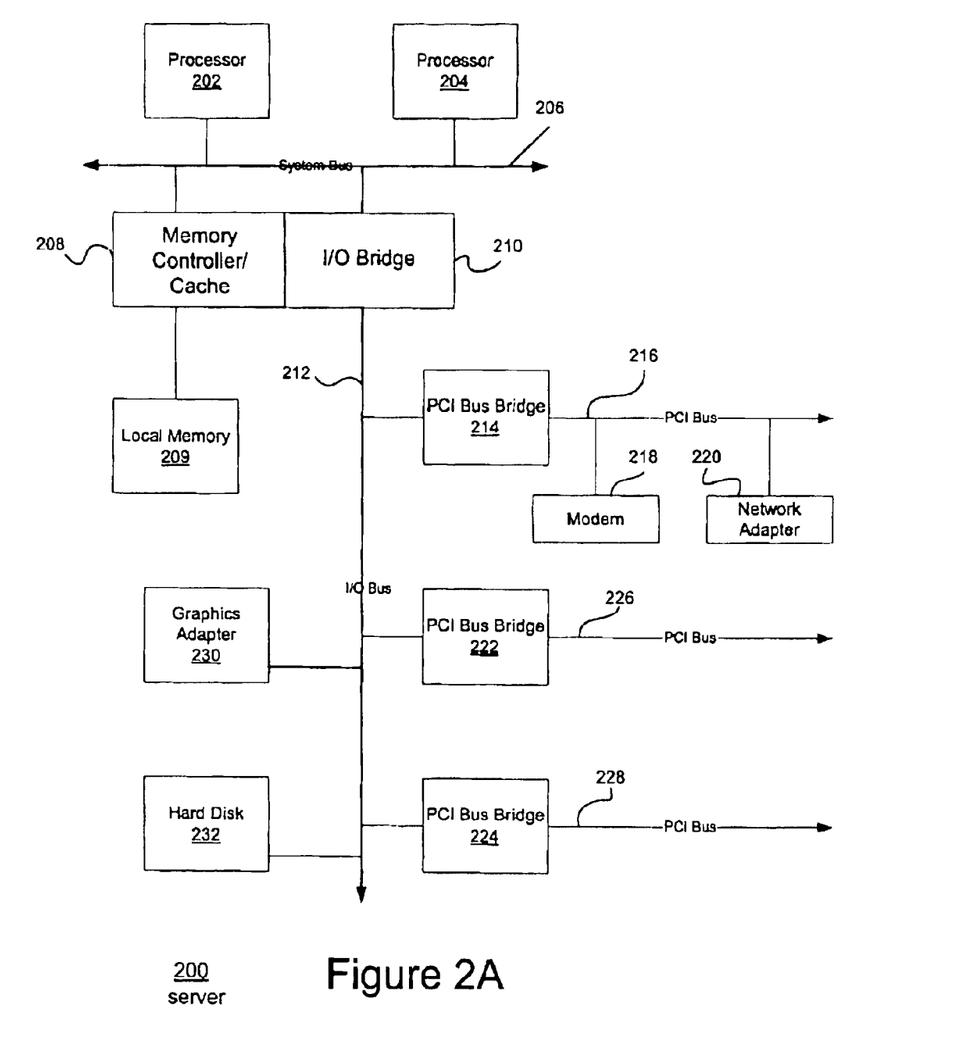
FIG. 2A is a block diagram of a data processing system which may be implemented as a server in accordance to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors.

Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
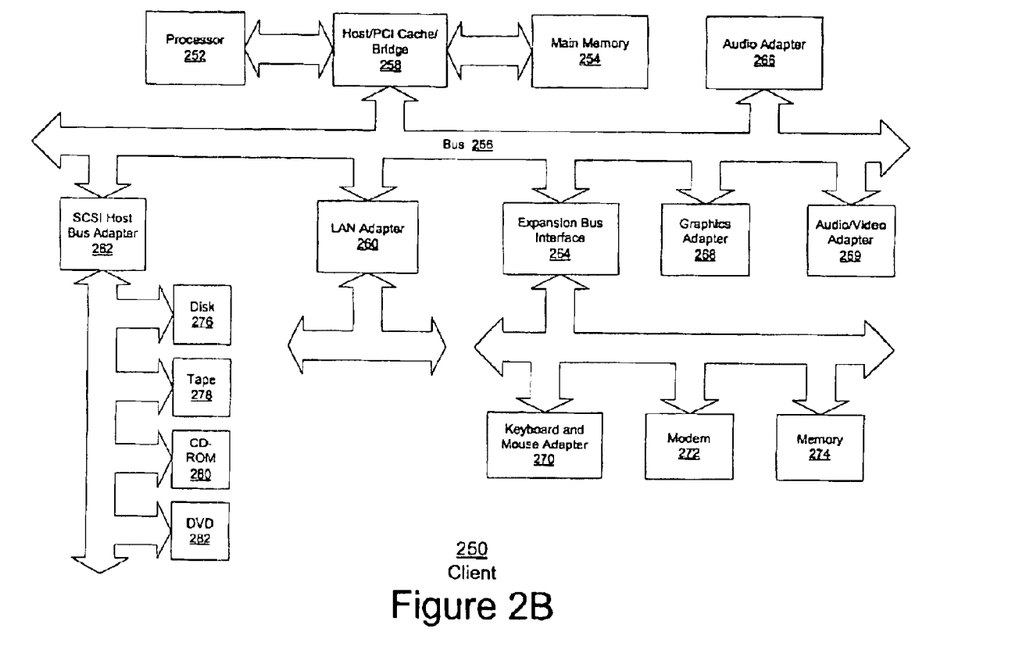
FIG. 2B is a block diagram of a data processing system in which the present invention may be implemented.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business™ or OS/2™, which are available from International Business Machines Corporation™. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for an audio server in a heterogeneous distributed environment. Although the present invention may operate on a variety of computer platforms and operating systems, it may also operate within a Java runtime environment. Hence, the present invention may operate in conjunction with a Java virtual machine (JVM) yet within the boundaries of a JVM as defined by Java standard specifications. In order to provide a context for the present invention, portions of the operation of a JVM according to Java specifications are herein described.

Figure 3:
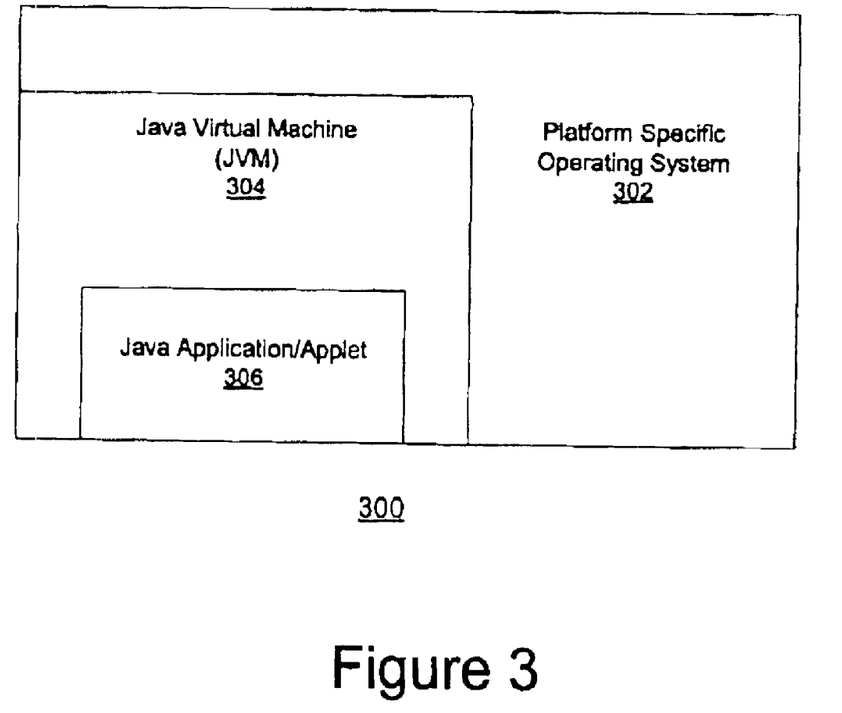
FIG. 3 is a block diagram illustrating the relationship of software components operating within a computer system that may implement the present invention.

With reference now to FIG. 3, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java runtime environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded pico-Java core.

At the center of a Java runtime environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format the compiled code is executable on many processors, given the presence of the Java runtime system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Bytecodes may be translated into native code by a just-in-time compiler or JIT.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

The present invention provides a process and system for an audio server in a heterogeneous distributed environment. The audio server provides an important link for a Java application running in a heterogeneous distributed environment in which the host system may be a larger multi-user system and the user system may be a desktop computer. A complete range of Java audio functionality is thus provided between the systems connected through the network. Although the following figures and examples describe a distributed audio server that employs the capabilities of a Java runtime environment operated in conjunction with an X Windows distributed environment or RAWT (Remote Abstract Window Toolkit) running on any hardware platform, the present invention may also be implemented using other runtime environments or operating systems. In other words, Java provides platform-independence for the audio server, and as examples, RAWT or X Windows provides a platform-independent or platform-specific environment, respectively, for the distributed functionality of a display server. However, other platform-independent and platform-specific software could provide similar capabilities so that one may develop the distributed audio server of the present invention in other environments. The supporting environments are intended as examples and not as architectural limitations for the processes of the present invention.

On a client machine operating under an x windows server, the X Windows software uses a DISPLAY environment variable in order to connect the user's client machine with the X Windows server. The DISPLAY environment variable is related to the Internet protocol (IP) address of the client machine. Each client machine has a different IP address, and the IP address has the form "xxx.xxx.xxx.xxx", where "xxx" represents an 8-bit value. The IP address uniquely identifies the client machine for a variety of software and network purposes.

The DISPLAY environment variable provides a label usable within application code for addressing a display to which an application may connect. In this manner, the application code may reference the DISPLAY environment variable without hard-coding a pointer to a specific display within the application code.

Environment variables generally reside in configuration files on a client machine. In the most common case, a user may set an environment variable within the configuration file in order to pass configuration values to an application program. For example, in the DOS operating system, a user may set environment variables within the "autoexec.bat" file, or the profile or .dtprofile on AIX, and environment variables within the file are then available in the runtime environment for various applications. The operating system may read the values in the configuration file in order to initialize the environment variables upon startup, or an application program may access the configuration file to dynamically read a value for an environment variable.

In the Java runtime environments, values may be stored in property files that are associated with Java applications. In another example, the Microsoft Windows operating system provides registry files that may be used to set environment variables for various applications. In some Unix implementations, a DISPLAY environment variable may be stored in a user's .login file or .profile file.

A value for a DISPLAY environment variable is generally specified using an assignment statement such as "DISPLAY=xxx.xxx.xxx.xxx". In this manner, the environment variable contains the IP address to which graphic data should be directed for display output, and the value may be changed to an appropriate IP address without changing the source code within an application program. In an x windows system, the DISPLAY environment variable would specify the IP address of the machine that is running an x windows server. A command line parameter may be specified by a user, however, in order to dynamically point the output of an application to a specific IP address. The command line parameter would take precedence over the environment variable specified in a file.

Figure 4:
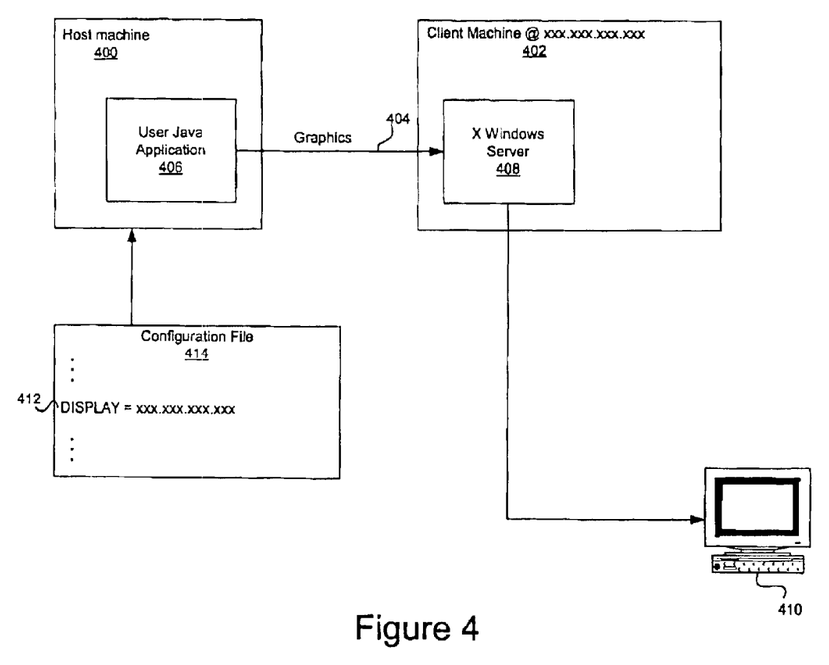
FIG. 4 is a block diagram depicting a typical organization for a remote Java application supported by an X Windows environment.

With reference now to FIG. 4, a block diagram depicts a typical organization for a remote Java application supported by an x windows environment. Host machine 400 and client machine 402 are connected by network link 404. User Java application 406 executes on host machine 400 and sends graphic data via network link 404 to X Windows server 408 executing on client machine 402. X Windows 408 then directs graphic data to display 410. DISPLAY environment variable 412 is stored within configuration file 414. The DISPLAY environment variable indicates the IP address of client machine 402 to which host machine 400 should direct graphic data generated by applications executing on host machine 400.

Figure 5:
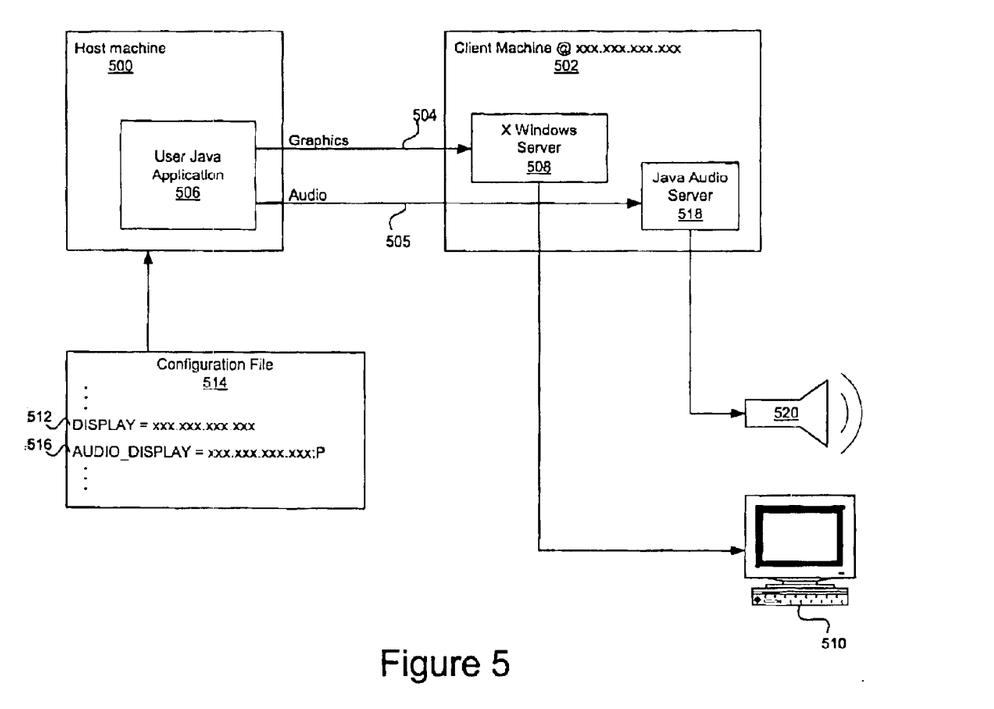
FIG. 5 is a block diagram depicting a distributed audio server implemented in accordance with the present invention.

With reference now to FIG. 5, a block diagram depicts a distributed audio server implemented in accordance with the present invention. Host machine 500 and client machine 502 are connected by network link 504. User Java application 506 executes on host machine 500 and sends graphic data via network link 504 to X Windows server 508 executing on client machine 502. X Windows 508 then directs graphic data to display 510. DISPLAY environment variable 512 is stored within configuration file 514. The DISPLAY environment variable indicates the IP address of client machine 502 to which host machine 500 should direct graphic data generated by applications executing on host machine 500.

FIG. 5 is similar to FIG. 4 in that a platform-specific environment, such as X Windows, supports a platform-independent environment, such as Java. However, FIG. 5 shows the manner in which an environment variable may be used to direct the audio generated by a user application to a client machine in use by the user. In the present invention, a special environment variable is used to direct audio data across the network to the Java audio server. Configuration file 514 contains AUDIO_DISPLAY environment variable 516 that specifies an IP address and port number to which host machine 500 should direct audio data generated by user Java application 506. Alternatively, a command line parameter may be specified by a user, however, in order to dynamically point the output of an application to a specific IP address. The command line parameter would take precedence over the environment variable specified in a file. Once the reference to the client machine has been retrieved, however, the present invention operates in the same manner no matter what the source of the reference.

The AUDIO_DISPLAY environment variable may be specified in a configuration file or properties file using an assignment statement such as "AUDIO_DISPLAY= xxx.xxx.xxx.xxx:P". Client machine 502 receives the audio data via network link 505 and passes the audio data to the application connected to the specified port number. In this case, Java audio server 518 processes the audio data and uses the underlying platform to generate sound through speaker 520. Network link 504 and network link 505 may be different logical network connections on the same physical network. Alternatively, client machine 502 may receive the audio data via different physical communication links.

In the preferred embodiment, the supporting code on the host machine just below the audio mixer writes audio buffers to an audio driver or multimedia subsystem on the host machine. The audio driver is preferably implemented in the Java runtime at the application level, thereby isolating it from affecting other applications in the system. Alternatively, the audio driver is implemented as a device driver as part of the operating system.

The audio driver on the host machine checks for the existence of a specified environment variable (or command line parameter), and if a special environment variable is defined, the audio driver writes the audio data with the appropriate protocol header information to the IP address specified in the AUDIO_DISPLAY environment variable.

The audio data may be broken into small data packets and sent to the client machine using the User Datagram Protocol (UDP). UDP is a connectionless protocol within TCP/IP that corresponds to the transport layer in the ISO network model. UDP converts data messages generated by an application into packets to be sent via the IP protocol but does not verify that messages have been correctly delivered. Alternatively, the Real Time Streaming (RTP) protocol may be used for the audio data packets as this protocol builds upon UDP.

The audio data packets may arrive at the audio server on the client machine in a timely manner, but because of the methodology of UDP, these packets may sometimes be out of order or a packet may be missing depending upon a network load. The audio server on the client machine will queue the packets and reorder the packets in order to play the audio content using the native audio support available on the client machine. Audio format processing and mixing may occur on the host machine in order to minimize the network bandwidth.

The Java-based audio server may be written in pure Java and may utilize the audio capabilities of the client machine. In this manner, the audio data may be played for the user at the client machine as if the audio data has been generated locally. The client machine need not be the same type of machine as the host machine given the platform-independence provided by Java.

When distributing audio data, it is important to provide some synchronization support so that other media may be played in a corresponding way, such as video data. In this implementation, when audio is sent from the host machine to the audio server on the client machine, it should be considered real-time data. Currently, in the Java Media Frameworks, video is synchronized with audio at the application level by writing audio packets to the audio device as near real-time as possible. In the present invention, the packets may be sent over the Internet and then played on the audio server at the user's machine. There will naturally be some small delay, but because the system may use UDP, the performance provided by UDP should be sufficient in most cases for adequate audio quality. The audio server may periodically send back some type of information to the generating application that provides an estimate of the delay time between the time point when the audio packet was sent and the time point at which the content within the audio packet was played. This estimate will provide the generating application with a better capability for synchronizing the generated audio and video that is sent to the client machine.

Figure 6:
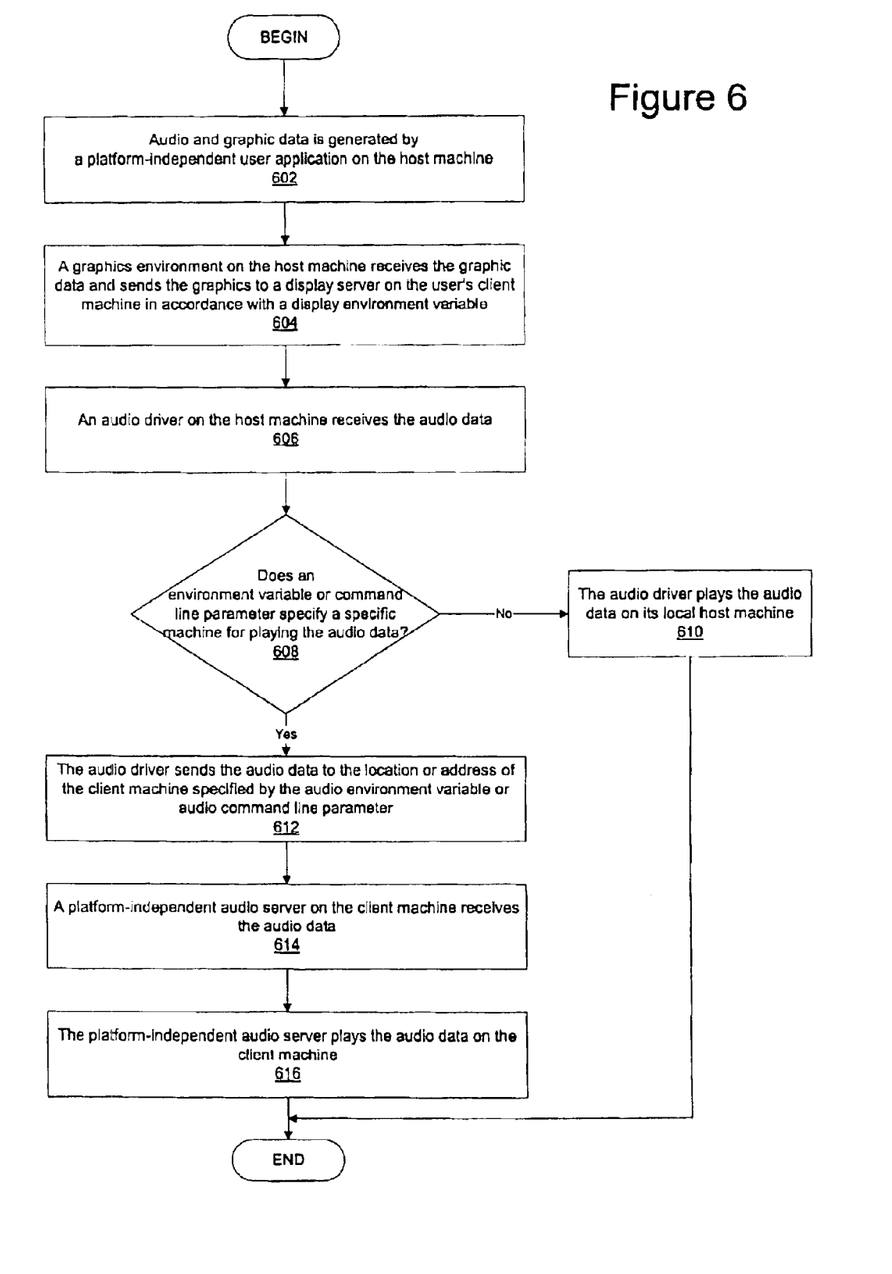
FIG. 6 is a flowchart depicting a process for generating and playing audio data in a distributed data processing system in accordance with the present invention.

With reference now to FIG. 6, a flowchart depicts a process for generating and playing audio data in a distributed data processing system in accordance with the present invention. The process begins with the generation of audio and graphic data by a platform-independent user application, such as a Java application (step 602). A platform-specific graphics environment receives the graphic data and sends the graphics to a display server on the user's client machine in accordance with a display environment variable (step 604). For example, an x windows environment on the host machine accepts the graphics and send the graphics to an x windows display server on the client machine in accordance with a DISPLAY environment variable, which may include displaying the graphic data on the host machine if the environment variable so dictates.

An audio driver on the host machine receives the audio data (step 606) and determines whether an environment variable (or command line parameter) specifies a specific machine for playing the audio data (step 608). If not, then the audio driver plays the audio data on its local machine (step 610), and the process completes. If an audio environment variable is specified, then the audio driver sends the audio data to the location or address specified by the audio environment variable (step 612). A platform-independent audio server receives the audio data (step 614) and plays the audio data on the client machine (step 616). The process is then completed with respect to the distributed, platform-independent audio server.

The advantages provided by the present invention should be apparent in view of the detailed description of the invention provided above. The present invention provides a distributed audio server that may be executed in a platform-independent manner on any client machine that supports the distributed execution or remote execution of an application. This allows audio data that is generated by a remote platform-independent application to be distributed to a user's client machine in parallel with the graphic data generated by the same application so that the audio content will be audible by the user.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for a distributed audio server, the method comprising the computer-implemented steps of:

generating audio data and graphic data in a platform-independent application;

sending the graphic data to a display server on a client machine specified by a display environment variable;

sending the audio data to a platform-independent audio server on the client machine specified by an audio environment variable or by an audio command line parameter; and synchronizing the graphic data and the audio data, wherein the synchronizing includes sending information back to the platform-independent application that generated the audio data and the graphic data, and wherein the information provides an estimate of a delay time between a first time point when an audio packet is sent and a second time point when the audio packet is played.

2. The method of claim 1 wherein the platform-independent application and the platform-independent audio server are implemented in the Java programming language.

3. The method of claim 1 wherein the display server is an X Windows display serer.

4. A method for a distributed audio server, the method comprising the computer-implemented steps of:

generating audio data in a platform-independent application;

in response to receiving the audio data at an audio driver, determining whether an audio environment variable or an audio command line parameter is defined;

if an audio environment variable or an audio command line parameter is defined, sending the audio data to a platform-independent audio server on a client machine specified by the audio environment variable or by the audio command line parameter;

generating graphic data in the platform-independent application;

sending the graphic data to a display server on the client machine specified by a display environment variable; and synchronizing the graphic data and the audio data, wherein the synchronizing includes sending information back to the platform-independent application that generated the audio data and the graphic data, and wherein the information provides an estimate of a delay time between a first time point when an audio packet is sent and a second time point when the audio packet is played.

5. The method of claim 4 wherein the platform-independent application and the platform-independent audio server are implemented in the Java programming language.

6. The method of claim 4 wherein the display server is an X Windows display server.

7. A data processing system for a distributed audio server, the data processing system comprising:

first generating means for generating audio data in a platform-independent application;

determining means for determining, in response to receiving the audio data at an audio driver, whether an audio environment variable or an audio command line parameter is defined;

first sending means for sending, in response to a determination that an audio environment variable or an audio command line parameter is defined, the audio data to a platform-independent audio server on a client machine specified by the audio environment variable or by the command line parameter;

second generating means for generating graphic data in the platform-independent application;

second sending means for sending the graphic data to a display server on the client machine specified by a display environment variable; and first synchronizing means for synchronizing the graphic data and the audio data, wherein the synchronizing includes sending information back to the platform-independent application that generated the audio data and the graphic data, and wherein audio packet is sent and a second time point when the audio packet is played.

8. The data processing system of claim 7 wherein the platform-independent application and the platform-independent audio server are implemented in the Java programming language.

9. The data processing system of claim 7 wherein the display server is an X Windows display server.

10. A computer program product on a computer-readable medium for use in a data processing system for a distributed audio server, the computer program product comprising:

instructions for generating audio data and graphic data in a platform-independent application;

instructions for sending the graphic data to a display server on a client machine specified by a display environment variable;

instructions for sending the audio data to a platform-independent audio server on the client machine specified by an audio environment variable or by an audio command line parameter; and instructions for synchronizing the graphic data and the audio data wherein the synchronizing includes sending information back to the platform-independent application that generated the audio data and the graphic data, and wherein the information provides an estimate of a delay time between a first time point when an audio packet is sent and a second time point when the audio packet is played.

11. The computer program product of claim 10 wherein the platform-independent application and the platform-independent audio server are implemented in the Java programming language.

12. The computer program product of claim 10 wherein the display server is an X Windows display server.

* * * * *